(No Model.)
P. A. DIXON.
HORSE DETACHER.
No. 455,179. Patented June 30, 1891.
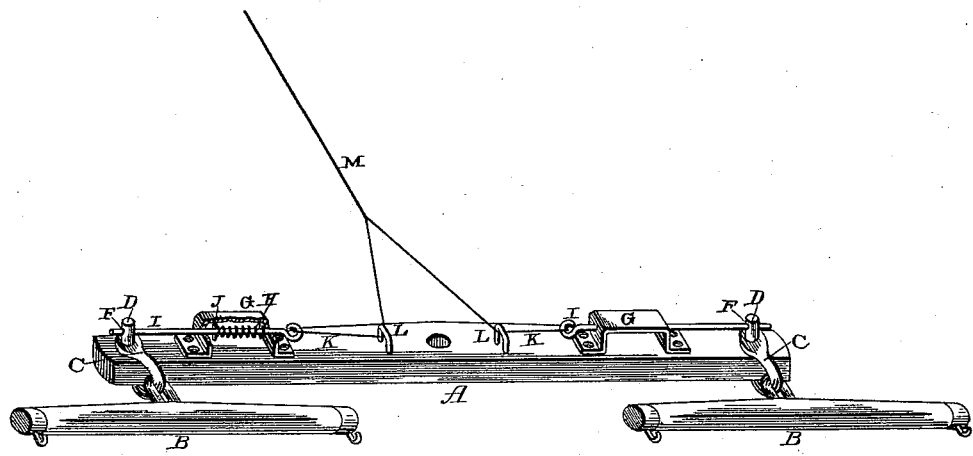
Witnesses:
E. P. Ells,
J. M. Hecht.
Inventor.
P. A. Dixon,
per Lehmann & Pattison,
Attys.

UNITED STATES PATENT OFFICE.

PRESTON A. DIXON, OF IVERSON, LOUISIANA.

HORSE-DETACHER.

SPECIFICATION forming part of Letters Patent No. 455,179, dated June 30, 1891.

Application filed March 16, 1891. Serial No. 385,155. (No model.)

*To all whom it may concern:*

Be it known that I, PRESTON A. DIXON, of Iverson, in the parish of Red River and State of Louisiana, have invented certain new and useful Improvements in Horse-Detachers; and I do hereby declare the following to be a full, clear, and exact description of the invention, such as will enable others skilled in the art to which it pertains to make and use it, reference being had to the accompanying drawing, which forms part of this specification.

My invention relates to an improvement in horse-detachers; and it consists in the combination and arrangement of parts which will be fully described hereinafter, and pointed out in the claims.

The object of this invention is to provide a device whereby the driver may instantly detach the horses from the wagon or other vehicle without leaving his seat.

The accompanying drawing is a perspective view of a doubletree embodying my invention and showing the whiffletrees connected thereto.

A represents the doubletree of ordinary construction, and B the whiffletrees, which are connected to the doubletree by means of the clevises C and pins D. These pins are cylindrical their entire length, which allows them to readily pass through the openings in the ends of the doubletree A. Near the upper ends of these pins are the notches or transverse openings F. Mounted on the top of the doubletree are the loops G, in which are confined the coiled springs H, and extending lengthwise through these loops and springs are the rods I. The outer ends of the springs H bear against stops J on the rods I, by which means the latter are held normally in an extended position. While in this position the outer ends of the rods engage the notches or openings F in the ends of the pins D and prevent the latter from dropping out of position. To the inner ends of the rods I are secured the ropes or straps K, which extend through suitable guides L, mounted on the doubletree, and to their free end is connected the main pull or operating-line M, which extends back within reach of the driver.

When it is desired to detach the horses from the vehicle, the driver exerts a pull on the line M, which moves each of the rods inward against the tension of the springs H, disengaging their outer ends from the pins D, when the latter drop by their own weight to the ground, thus releasing the whiffletrees from the doubletree and effectually and instantly disconnecting the horses from the vehicle. After the pin drops from the clevis it is suspended by a cord or small chain, which prevents it from dropping to the ground.

Having thus described my invention, I claim—

1. In a horse-detaching device, a doubletree, spring-actuated rods mounted thereon, clevis-pins supported by the outer ends of the said rods, and suitable operating-cords, combined substantially as shown and described.

2. In a horse-detaching device, a doubletree, spring-actuated rods mounted thereon, clevis-pins provided with notches or openings in which the outer ends of the rods engage, and suitable operating-cords, combined substantially as shown and described.

3. In a horse-detaching device, the doubletree, loops mounted thereon, springs confined within the loops, rods passing through said loops and springs and having their outer ends to engage the clevis-pins, and the operating-lines connected to the inner ends of said rods, combined substantially as shown and described.

In testimony whereof I affix my signature in presence of two witnesses.

PRESTON A. DIXON.

Witnesses:
   JNO. B. BROWN,
   T. G. MCGRAW.